Jan. 19, 1965   J. RUDELICK   3,166,091
FLOAT CONTROLLED VALVE
Filed June 23, 1961   3 Sheets-Sheet 1
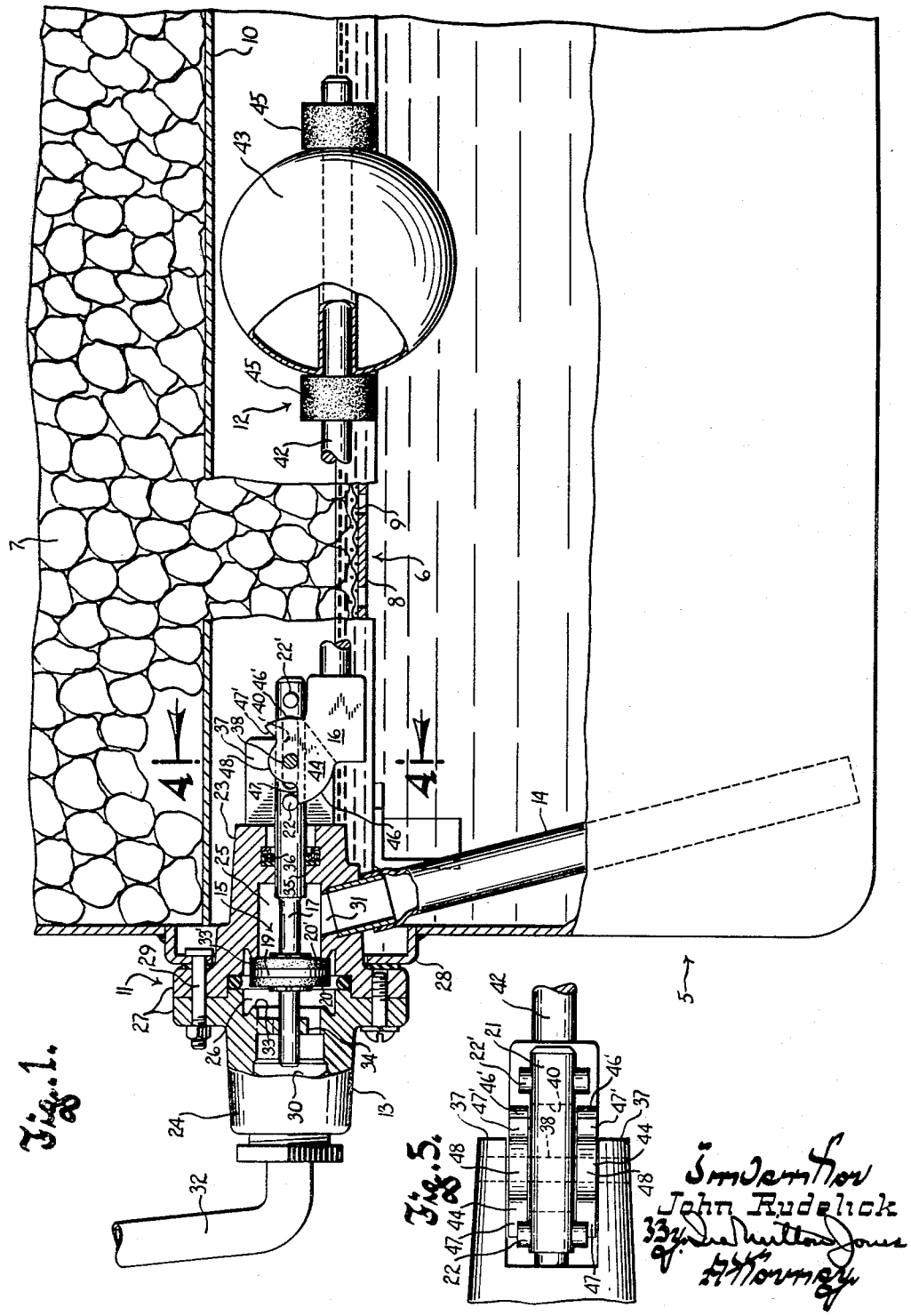

Jan. 19, 1965       J. RUDELICK       3,166,091
FLOAT CONTROLLED VALVE
Filed June 23, 1961       3 Sheets-Sheet 2
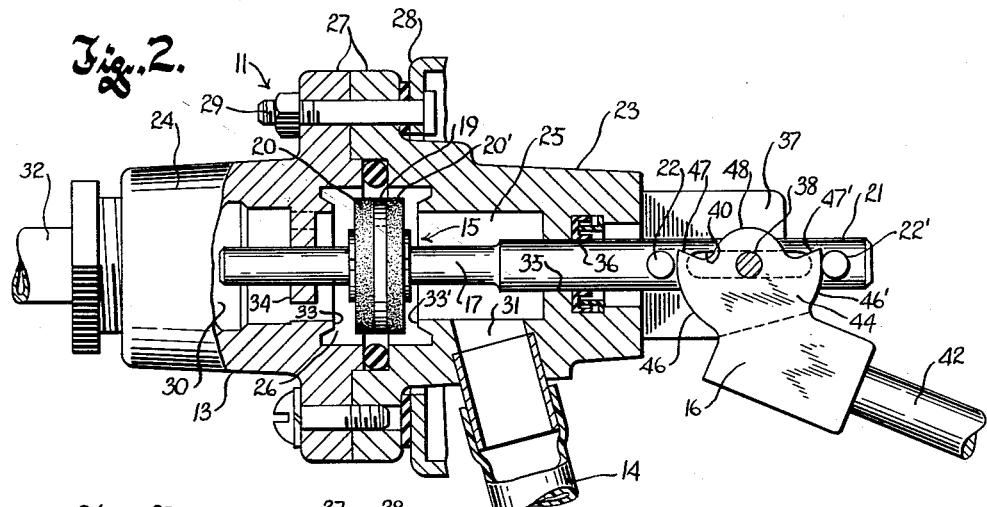
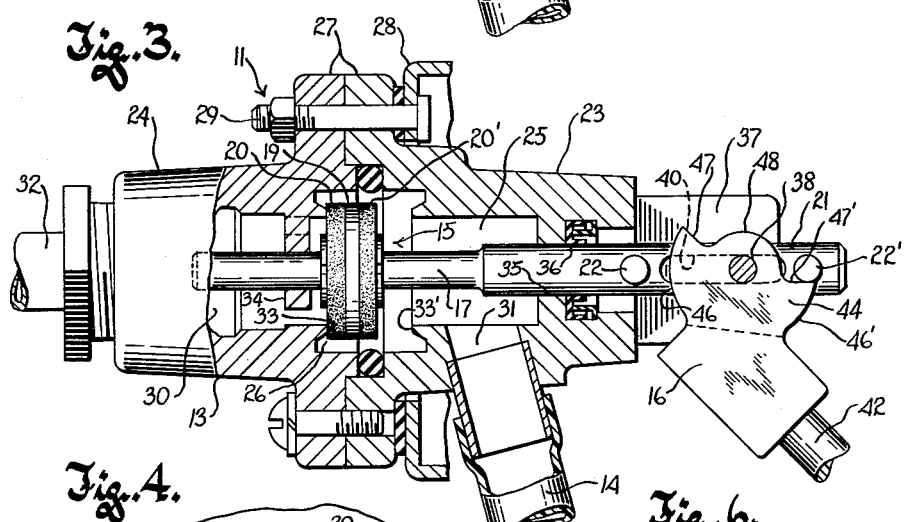
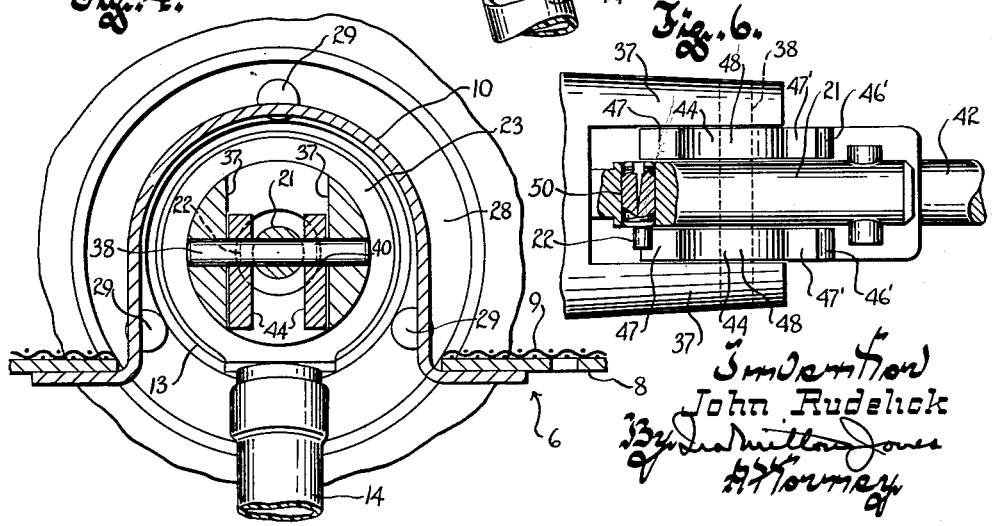
Inventor
John Rudelick
By
Attorney

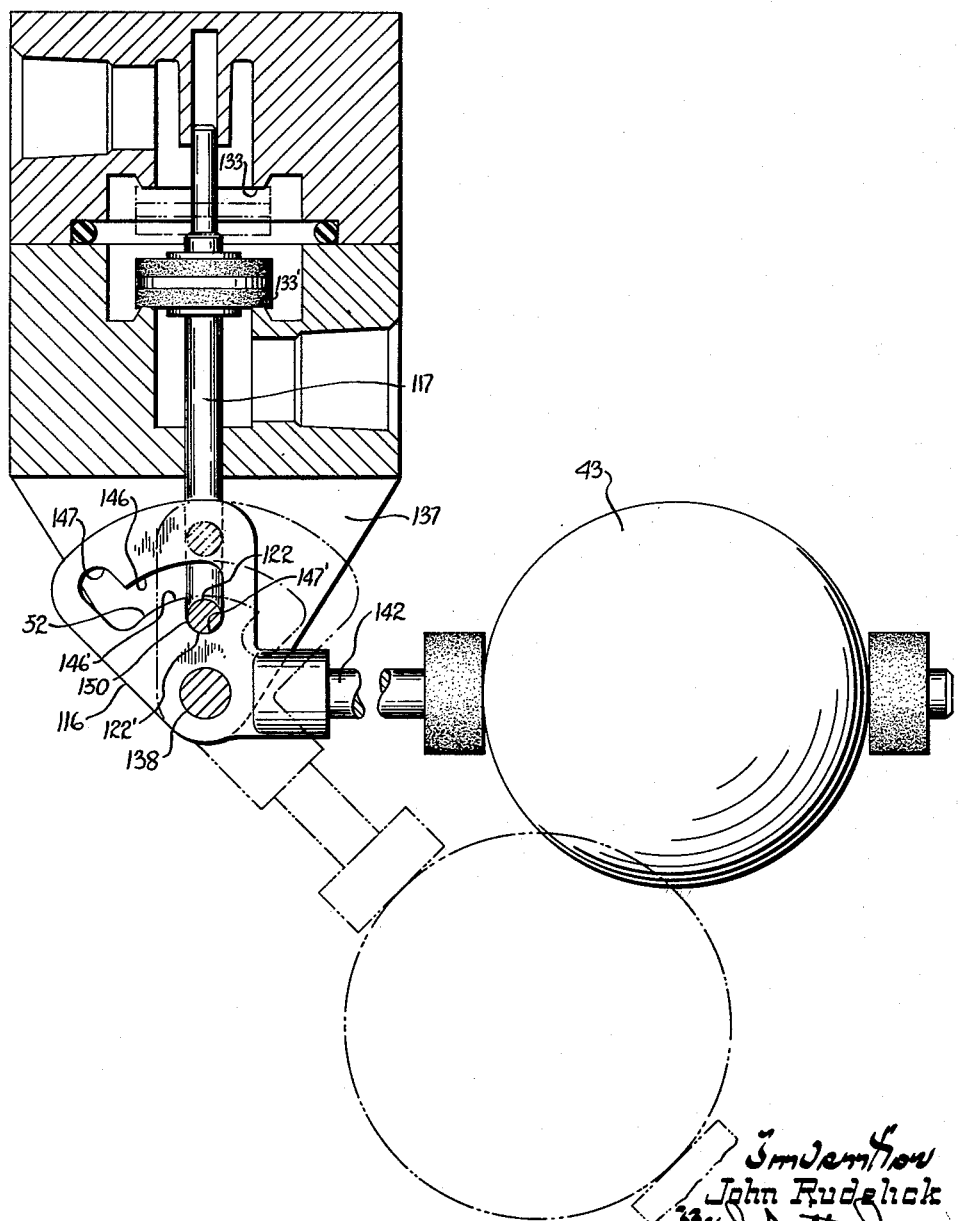

3,166,091
FLOAT CONTROLLED VALVE
John Rudelick, Milwaukee, Wis., assignor to Bruner Corporation, Milwaukee, Wis., a corporation of Wisconsin
Filed June 23, 1961, Ser. No. 119,133
2 Claims. (Cl. 137—391)

This invention relates to float controlled valves, and refers more particularly to a valve through which liquid is filled into and withdrawn from a vessel and which terminates filling and emptying of the vessel when liquid therein reaches predetermined high and low levels, respectively.

Float actuated valves of the type here under consideration are commonly used as so-called brine valves in automatic water softeners, where they are mounted in the brine vessel and control the level to which fresh water is filled into the vessel and the level to which brine is withdrawn therefrom. In such water softeners the brine vessel is of course separate from the softening tank that contains the bed of ion exchange material. When the ion exchange material is to be regenerated, brine is transferred from the brine vessel to the softening tank, usually by means of an injector through which a stream of fresh water flows to the softening tank and by which brine is drawn from the brine tank into the fresh water stream. The suction effect produced by the flow of fresh water through the injector opens the brine valve, allowing brine to flow out of the brine vessel through the valve until the brine in the vessel falls to a predetermined low level, and then the brine valve is closed by its float actuator to stop further withdrawal of brine from the vessel and thus prevent eduction of air into the stream of fresh water which continues to flow to the water softening tank. In a subsequent phase of the regeneration cycle fresh water is filled into the brine vessel through the brine valve, to provide for the formation of brine for the next regeneration, and when liquid in the brine vessel rises to a predetermined level the brine valve is automatically closed by its float actuator to terminate filling.

Recently there has come into general use in automatic water softener systems a type of brine vessel which may be referred to as the dry salt platform type, wherein the salt store is supported on a foraminous shelf-like supporting member, or platform, that is spaced above the bottom of the vessel. The water level in the brine vessel is normally maintained only very slightly above the upper surface of the platform, so that substantially only the bottom surface of the salt store is in contact with water, and the major portion of the salt store thus remains dry. With a dry salt storage platform type of briner it is important that the brine valve be capable of very accurate control of the level to which liquid is filled into the brine vessel, and that the valve close promptly and positively as soon as liquid in the vessel reaches the bottom of the salt store, since otherwise an excessively large portion of the salt store would be immersed in water and the advantages of the dry salt platform type of briner would be lost.

With the foregoing in mind, it is a general object of this invention to provide a float actuated valve of the type through which liquid is filled into and withdrawn from a vessel, and which closes to terminate filling and emptying of the vessel when liquid therein reaches predetermined maximum and minimum levels, respectively; which valve is particularly well adapted for use as a brine valve in dry salt platform type briners for water softening systems by reason of the fact that it has a very positive closing action when its float actuator reaches both the maximum and the minimum liquid levels for which the valve is adjusted.

In this connection, a more specific object of this invention resides in the provision of a float actuated valve of the character described having a valve element which is actuated to either of a pair of closed positions by the pressure of liquid flowing through the valve body, rather than by the buoyancy and/or weight of the float actuator, and wherein means under the control of the float actuator releasably holds the valve element out of its closed positions so long as the float actuator is between defined limits of motion but permits the valve element to move to one or the other of its closed positions, depending upon the direction of liquid flow through the valve body, when the float actuator reaches one or the other of its defined limits of motion.

Another object of this invention is to provide an inexpensive and dependable float actuated valve for water softener briners and the like which can be readily mounted in a brine vessel and can be adjusted to close when liquid in the vessel reaches any one of a number of different minimum levels, and with which such adjustment can be readily accomplished merely by setting the float at different positions along the length of the float arm. It is also an object of this invention to provide such a valve wherein adjustment of the float to control the minimum liquid level for valve closure does not affect the upper level at which the valve closes, so that the valve of this invention is particularly suitable for dry salt platform briners, which must always be filled to the same liquid level, regardless of the amount of brine that is removed at each withdrawal.

Still another object of this invention resides in the provision of a dry salt platform type of briner having a float actuated valve by which the filling of liquid into the brine vessel and its withdrawal therefrom is controlled, and wherein the foraminous member on which the salt store is supported does not interfere with operation of the float actuator for the valve.

It is a further specific object of this invention to provide a float actuated valve of the character described having in its body a very simple movable valve element that comprises a pair of oppositely facing resilient disc-like valve members coaxially carried on a stem which is slidably guided in the valve body and which projects to the exterior thereof.

Still another specific object of this invention is to provide a float actuated valve of the character described which attains all of the above stated objectives and which, moreover, is capable of providing a throttled flow through any desired portion of its range of float actuator motion. Such a valve is particularly useful in water softener brine vessels of the type having an upright partition that separates the vessel into a brine compartment and a valve compartment, and wherein fresh water entering the vessel through the brine valve is introduced into the valve compartment, whence it makes its way into the brine compartment through a port or ports in the partition. If the incoming fresh water enters the valve compartment of such a briner more rapidly than it can flow out of the same through the partition, the float actuator will close the valve before the proper volume of water has entered the vessel. Hence it follows that it is another object of this invention, related to the objective of providing a float actuated valve capable of affording a substantially throttled or restricted flow of liquid, to provide a brine valve which will not close until the full required volume of water has been filled into the brine vessel in which it is installed, but which is capable of permitting substantially unrestricted flow of fresh water during the initial stages of filling of the vessel so as to expedite the filling process.

With the above and other objects in view which will appear as the description proceeds this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a fragmentary side elevational view of a brine vessel having a valve of this invention therein, with portions of the vessel and the valve broken away and shown in section;

FIGURE 2 shows the valve of this invention per se, partly in side elevation and partly in section, with the float arm in a position in which the valve is open;

FIGURE 3 is a view similar to FIGURE 2 but showing the valve in a closed position in which it prevents withdrawal of liquid from a vessel in which it is installed;

FIGURE 4 is a cross sectional view of the valve, taken on the plane of the line 4—4 in FIGURE 1;

FIGURE 5 is a fragmentary top view of the valve;

FIGURE 6 is a fragmentary top view of a modified form of the valve shown in FIGURES 1–5; and FIGURE 7 is a vertical sectional view of a further modified embodiment of the valve of this invention.

Referring now to the accompanying drawings, the numeral 5 designates generally a water softener brine vessel of the dry salt platform type, having a foraminous platform 6 spaced a substantial distance above its bottom, upon which a salt store 7 is adapted to rest. The platform comprises a foraminous shelf-like horizontal supporting member 8 of metal, plastic or other rigid material, which carries a relatively fine mesh screen 9 that prevents small salt particles from falling through the holes in the supporting member.

In this case the brine vessel does not have the usual upright partition, but instead the platform has its medial portion bowed upwardly to define an inverted U-shaped "tunnel" or channel 10 beneath which the valve 11 of this invention and its float actuator 12 are accommodated. The valve 11, which serves to control the filling of fresh water into the vessel and the withdrawal of brine therefrom, is mounted in the side wall of the vessel, and projects forwardly into the valve compartment. While the valve could be mounted at any elevation above the bottom of the vessel, consistent with proper operation of its float actuator 12, it is shown in the present case as mounted in the neighborhood of the desired highest liquid level in the vessel. To allow liquid to be withdrawn from the vessel when the level of such liquid falls below the elevation of the valve body 13 a flexible tube 14 extends downwardly from the valve body into the vessel, nearly to the bottom of the vessel. The tunnel 10 of course allows the float actuator to swing up to a substantially horizontal position as liquid in the vessel rises to its maximum level, without interference from the platform.

In general the valve 11 comprises, in addition to the valve body 13 and the float actuator 12, a movable valve element 15 and a cam-like control element or abutment member 16 which comprises a part of the float actuator and provides a connection between said actuator and the valve element. The valve element comprises a stem 17 to which is fixed a coaxial head consisting of a rigid reinforcing disc 19 and a pair of resilient sealing discs 20 and 20', one at each axial side of the rigid disc. The valve element is mounted in the body for axial sliding motion with its head inside the valve body, and with a portion 21 of its stem 17 at all times projecting forwardly from the valve body. Opposing shoulder means 22 and 22' at axially spaced apart locations on the projecting portion 21 of the valve stem cooperate with the control element 16 in a manner described hereinafter to control the position of the valve element in accordance with the position of the float actuator.

The valve body can be readily formed in two parts, comprising a front body portion 23 and a rear body portion 24, which cooperate to define a passage 25 through the valve body that includes a chamber 26 in which the head of the valve element is situated. Coaxial flanges 27 around the body parts provide for their connection and also provide for securement of the valve to a suitable annular mounting pad 28 or the like on the brine vessel 5, as by means of bolts 29.

The passage 25 through the valve body terminates at the rear of the body in a coaxial rear port 30 and at the front of the body in a downwardly opening front port 31 at the underside of the body, to which the flexible tube 14 is connected. A suitable duct 32 communicates the rear port 30 with another part of the apparatus in which the valve is installed. When the valve element is in an open position, with its discs 20 and 20' intermediate the seats 33 and 33', liquid can flow through the valve chamber 25 from one of the ports to the other by reason of the fact that the diameter of said chamber is substantially larger than that of the discs comprising the head of the valve element.

To guide the valve element for axial back and forth motion in the valve body its stem 17 is slidably received in a coaxial spider portion 34 which may be formed integrally with the rear valve body member, and in a coaxial bore 35 through the front body member, opening from the hollow interior thereof. A suitable seal 36 around the stem prevents air from leaking into the valve body through the bore 35 when the level of liquid in the vessel is below the mouth of said bore; but this seal can be omitted if the valve is so mounted in the vessel as to be at all times below the level of liquid therein.

The projecting front end portion 21 of the valve element stem is disposed between and parallel to a pair of forwardly projecting bifurcations 37 on the front body member that support a pin or trunnion 38 on which the float actuator is pivoted for up and down swinging motion and which extends through a slot 40 in the front end portion of the stem. The float arm comprises a rod or tube 42 having its inner end secured to the control element 16 and having a buoyant float 43 secured on its outer end portion. The float 43 is axially adjustable along the length of the rod or tube 42 and is held in any desired position of such adjustment as by means of resilient friction washers 45 which snugly embrace the rod. Such axial adjustment of the float provides for control of the minimum liquid level in the vessel at which closure of the valve takes place, as hereinafter explained.

The control element or abutment member 16 has identically shaped cam-like bifurcations 44 which straddle the projecting portion 21 of the valve stem and are confined between the bifurcations 37 on the front of the valve body. The pin or trunnion 38 of course extends through the bifurcations of the control element to mount it for pivotal motion by which the float actuator is allowed to swing up and down. The peripheral surfaces of the two cam-like bifurcations of the control element provide abutment surfaces which cooperate with the shoulders 22 and 22' on the valve stem to provide, in effect, a releasable latch connection between the valve element and the float actuator. The shoulders 22 and 22' can be provided by pins fixed in the valve stem and projecting to opposite sides thereof, and it will be observed that the trunnion pin 38, in extending through the slot 40 in the valve stem, prevents the latter from rotating out of a position in which the axes of shoulder pins 22 and 22' are parallel to that of the trunnion pin.

The periphery of each of the bifurcations on the abutment member provides a pair of large radius lower abutment surfaces 46 and 46', which may be coaxial with the trunnion 38 and which terminate abruptly at substantially radially inwardly extending surfaces 47 and 47'. A smaller radius edge portion 48 extends around the top of each bifurcation of the control element, from the inner ends of the radial surfaces 47 and 47'.

When the float arm is in any of a range of intermediate positions (as shown in FIGURE 2), corresponding to liquid levels in the vessel which are between the highest and lowest desired levels, one or the other of the shoulders 22 and 22' on the valve stem engages an arcuate portion 46 or 46' on the periphery of the abutment member 16 by which the valve element is held in an intermediate position, with the discs 20 and 20' spaced from both of their cooperating seats. Thus FIGURE 2 illustrates the conditions which obtain when liquid is being drawn out of the vessel in which the valve is mounted, flowing from the front port 31 to the rear port 30 in the valve body. The liquid acts upon the valve element 15 to urge it rearwardly, toward engagement of the disc 20 on the valve element with its seat 33, but until the liquid in the vessel falls to the desired minimum level, the arcuate cam-like surface 46' on the abutment member will be engaged by the shoulder 22' on the stem to restrain the valve element against movement to its seated position.

If the flow of liquid through the valve body were reversed, with liquid being filled into the vessel through the valve, such liquid flow would of course urge the valve element toward engagement of the disc 20' on the valve element with the front seat 33', and under these circumstances, with the float arm in the position shown in FIGURE 2, the rear shoulder 22 on the valve stem would engage its adjacent arcuate surface 46 on the cam-like abutment member to cooperate therewith in holding the valve element in its intermediate or open position.

As liquid continues to be withdrawn from the vessel and the float arm swings down to the angle illustrated in FIGURE 3, corresponding to the minimum desired liquid level, the cam-like arcuate surface 46' on the abutment member 16 rotates away from engagement with the shoulder 22' on the valve stem, allowing said shoulder to move inwardly along the radial surface 47' on the abutment member as the valve element moves in response to liquid pressure to its closed position in which the disc 20 engages the rear seat 33. It will be observed that the valve element will remain in that closed position so long as pressure in the duct 32 is lower than that in the tube 14, and that the pressure of the liquid itself, rather than the weight of the float actuator, is relied upon to maintain good sealing engagement between the valve element and its seat.

When pressure in the duct 32 subsequently increases, at the commencement of filling of the vessel, the valve element is of course forced off of its rear seat 33 and urged forwardly toward the front seat 33' by the liquid flowing toward the vessel, but the rear shoulder 22 on the valve stem now engages the arcuate abutment surface 46 on the control element to hold the valve element in its intermediate open position. It might be noted at this point that the opposing faces of the shoulders 22 and 22' on the valve stem are spaced apart by a distance somewhat greater than the combined radii of the arcuate surfaces 46 and 46' on the abutment member, so that when the rear shoulder 22 engages the cam-like arcuate surface 46, the front shoulder 22' will be well clear of its adjacent arcuate surface 46' and out of engagement with the radial surface 47' so as not to interfere with upward swinging of the float arm as the liquid level rises in the vessel. As liquid in the vessel rises to the level at which the float arm extends substantially horizontally from the valve body, as shown in FIGURE 1, the arcuate surface 46 on the abutment member is rotated out of engagement with the rear shoulder 22 on the valve stem, and said shoulder moves forwardly along the radial surface 47 on the control member as the valve element moves into engagement with its front seat 33' in response to the pressure of incoming liquid, thereby terminating filling of the vessel.

With the valve mounted in the position shown in FIGURE 1, substantially at the maximum desired liquid level, the float arm will always be in a substantially horizontal position when liquid in the vessel reaches said level, regardless of the position of the float 43 along the length of the rod or tube 42, and consequently any change in the adjustment of the float will affect only the minimum level to which liquid can be withdrawn from the vessel. This is important in a dry salt platform type of briner, which should always be filled with fresh water to a level very slightly above that of the salt supporting platform, but in which provision should desirably be made for adjustment of the volume of brine draw-off at each regeneration to accommodate the conditions of water hardness, frequency of regeneration, etc., of the particular water softener installation.

It will be seen from the foregoing description of the operation of the valve that when the float actuator is in its intermediate range of positions the spacing of each resilient disc 20 and 20' on the valve head from its adjacent seat 33 and 33' is governed by the radius of the arcuate abutment surface 46 and 46' which holds the valve element unseated. It follows that flow of liquid through the valve in either direction can be throttled by suitably decreasing the radius of the proper arcuate abutment surface 46 or 46'. Thus it is desirable in some cases to permit rapid flow of liquid into the vessel during the initial stages of filling, but to effect a decreasing flow rate as liquid in the vessel approaches the desired maximum level; and under these circumstances the abutment surface 46 would have a radius which decreased circumferentially toward the surface 47, thus allowing the valve element to approach its seat as the float arm rises.

FIGURE 6 illustrates another means of obtaining regulation of rate of flow of fluid through the valve. The shoulder 22 on the valve stem is provided by a pin or screw 50 which is rotatably seated in the stem and which has an eccentric projecting portion that defines the shoulder. As the pin 50 is rotated, the position of its projecting shoulder defining portion is relatively shifted axially along the valve stem 17, thus changing the spacing of the disc 20' from its seat 33' when the valve is in its open position. Obviously either or both of the shoulders 22 and 22' on the valve stem can be made adjustable in this manner, and such adjustable shoulders can cooperate with arcuate surfaces on the abutment member which are of non-uniform radius as well as those having a constant radius.

In the embodiment of the invention illustrated in FIGURE 7 the stem 117 of the valve element carries a single pin 150 which provides oppositely facing abutment surfaces 122 and 122' thereon, and which cooperates with the opposite edge portions of a slot 52 in the cam-like control element or abutment member 116. As in the case of the previously described embodiment of the valve, the abutment member 116 is mounted on a pin or trunnion 138 carrid by bifurcations 137 on the valve body, and the rod 142 comprising the outer portion of the float arm is secured to the abutment member to swing the same about the trunnion axis as the float 43 rises and descends with the level of liquid. In this instance, however, the abutment member 116 is in the nature of a box cam, and its slot 52 has opposite curved edge portions 146 and 146' that define circular arcs centered on the axis of the trunnion 138. These curved edge portions of the slot terminate at one end at a notch 147 that extends radially away from the trunnion axis and at the other end at a notch 147' that extends radially toward the trunnion axis.

As the float arm swings either upwardly or downwardly through the medial portion of its range, the shoulder defining pin 150 is confined in the arcuate medial portion of the slot 52 to cooperate with the curved edge portions 146 and 146' of the abutment member in holding the valve element out of engagement with its seats 133 and 133'. As the float arm swings up to its maximum liquid level position, shown in full lines, the notch portion 147' of the slot 52 is brought into alignment with the pin 150, allowing the valve element to engage the seat 133' and prevent further flow of liquid through the valve and into the vessel in which the valve is mounted. When the float arm swings down to the minimum liquid level, the notch portion 147 of the slot 52 aligns with the pin 150, allowing the valve element to engage its other seat 133 to prevent further withdrawal of liquid from the vessel in which the valve is mounted.

The valve illustrated in FIGURE 7 is well adapted for mounting with the axis of its stem 117 upright, and it is therefore better suited than the valve of FIGURES 1–6 to mounting in a relatively narrow vessel or tank. It may be somewhat more expensive to produce, however, because of the necessity for forming the slot 52 in the abutment member 116.

From the foregoing description taken together with the accompanying drawings it will be apparent that this invention provides a float actuated valve which is particularly well suited for installation in dry salt platform type briners by reason of the fact that it permits adjustment of the minimum liquid level in a vessel in which it is installed, for regulation of the amount of liquid removed from the vessel at each withdrawal, but provides for maintenance of an invariable predetermined maximum level of liquid in the vessel, irrespective of the minimum liquid level for which the valve may be adjusted. It will be further apparent that in the valve of this invention the valve element is moved to and held in its seated position in response to the pressure of liquid flowing through the valve body, rather than by the weight and buoyancy of the float actuator, thus affording a very positive valve action. It will also be seen that the valve of this invention can effect throttled flow of liquid into or out of a vessel, either through the entire range of motion of its float actuator or through any desired part thereof.

What is claimed as my invention is:

1. A valve through which liquid can be both filled into and withdrawn from a vessel, and which terminates flow of liquid to and from the vessel when liquid therein reaches predetermined maximum and minimum levels, respectively, said valve comprising:
   (A) a valve body having
      (1) a passage therethrough opening to spaced apart external ports in the valve body, to and from each of which liquid can flow,
      (2) a valve chamber provided by an intermediate portion of said passage,
      (3) annular valve seats in said passage that oppose one another and face into the valve chamber;
   (B) a stem member in the valve body extending through the valve chamber and coaxially through the valve seats and having a portion projecting to the exterior of the valve body;
   (C) a valve element coaxially fixed on said stem member, intermediate the ends thereof, and disposed in said valve chamber, said valve element having a pair of surfaces that oppose and are engageable with said valve seats;
   (D) means in the valve body slidably supporting the stem member at axially opposite sides of the valve chamber to provide for liquid pressure responsive movement of the valve element in opposite axial directions, to each of a pair of closed positions at which one of said surfaces engages its opposing valve seat, and to an intermediate open position in which both of said surfaces are spaced from their opposing seats;
   (E) a float member mounted for movement in opposite directions relative to the valve body between defined upper and lower limits; and
   (F) a pair of cooperating latch elements, each connected with one of said members for movement therewith, comprising cooperating abutments on the float member and on said portion of the stem member that are engaged whenever the float member is between its limits of motion to provide an interlock by which the valve element is held in its intermediate position, against flow responsive movement to a closed position, but which are disengaged in consequence of movement of the float member to one of its limits of motion to release the stem member for liquid pressure responsive movement of the valve element to a closed position.

2. A valve through which liquid can be both filled into and withdrawn from a vessel, and which terminates flow of liquid to and from the vessel when liquid therein reaches predetermined maximum and minimum levels, respectively, said valve comprising:
   (A) a valve body having
      (1) a passage therethrough opening to spaced apart external ports in the valve body, to and from each of which liquid can flow,
      (2) a valve chamber provided by an intermediate portion of said pasage, and
      (3) annular valve seats in said passage that oppose one another and face into the valve chamber;
   (B) a valve element in said valve chamber having valve surfaces that face toward said valve seats and having a coaxial stem;
   (C) means in the valve body slidably supporting the stem of the valve member to provide for liquid pressure responsive movement of the valve element in opposite axial directions, to each of a pair of closed positions at which one of said valve surfaces engages its opposing seat, and to an intermediate open position in which both of said surfaces are spaced from their opposing seats;
   (D) a float arm member mounted for swinging up and down motion between defined limits about an axis fixed with respect to the valve body;
   (E) a float on said float arm member;
   (F) cam follower means on said portion of the stem of the valve member; and
   (G) a cooperating cam connected to the float arm member to swing therewith and having arcuate cam surfaces facing in opposite directions axially of the stem which are engageable by the cam follower means when the float arm is between its limits of motion, and which are of such arcuate length as to be disengaged from the cam follower means when the float arm reaches each of its limits of motion to free the valve element for fluid pressure responsive movement into engagement with one of the valve seats.

References Cited in the file of this patent
UNITED STATES PATENTS

| | | |
|---|---|---|
| 2,556,872 | Deters | June 12, 1951 |
| 2,710,018 | Wolfe | June 7, 1955 |
| 2,814,306 | Ponsar | Nov. 26, 1957 |
| 2,820,419 | Albertson | Jan. 21, 1958 |

FOREIGN PATENTS

| | | |
|---|---|---|
| 519,147 | Canada | Dec. 6, 1955 |